United States Patent [19]

Baliozian

[11] 4,264,168
[45] Apr. 28, 1981

[54] PROJECTION DEVICE, ESPECIALLY FOR PHOTOGRAPHY, MOTION PICTURES AND TELEVISION

[76] Inventor: Mardick Baliozian, 15 route de Val Martin, Sainte Gemme, Feucherolles 78810, France

[21] Appl. No.: 954,556

[22] Filed: Oct. 25, 1978

[30] Foreign Application Priority Data

Nov. 4, 1977 [FR] France ............................... 77 33266

[51] Int. Cl.³ ...................... G03B 21/06; G03B 29/00
[52] U.S. Cl. ........................................ 354/77; 352/89; 353/65; 354/80
[58] Field of Search ................... 354/77, 291, 80, 292; 352/89, 90; 355/39, 64, 67; 353/28, 37, 63–67

[56] References Cited

U.S. PATENT DOCUMENTS

| | | | |
|---|---|---|---|
| 1,859,761 | 5/1932 | Blohm | 353/66 |
| 3,227,509 | 1/1966 | Baker | 354/77 |
| 3,350,980 | 11/1967 | Margolin | 354/77 |
| 3,911,450 | 10/1975 | Schwartz | 354/77 |

FOREIGN PATENT DOCUMENTS

2460501  6/1976  Fed. Rep. of Germany ........... 354/291

*Primary Examiner*—John Gonzales
*Attorney, Agent, or Firm*—Michael J. Striker

[57] ABSTRACT

A housing which is adjustable for height and within which is placed an object to be projected onto a screen also contains a light source and a reflecting system, the light emitted by the source being reflected onto the object. The top face of the housing is pierced in order to permit the passage of the luminous flux through an optical system which is placed above the housing and cooperates with a camera for photographing the projected image of the object on the screen. Adjustable means are provided for optical coupling between the camera and the assembly consisting of optical system and housing.

9 Claims, 5 Drawing Figures

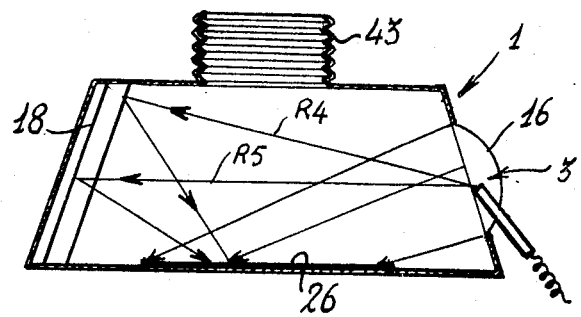
Fig:2
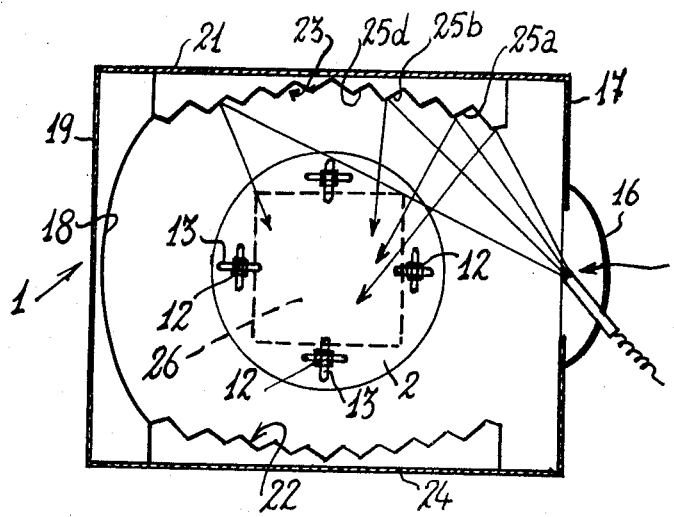
Fig:3
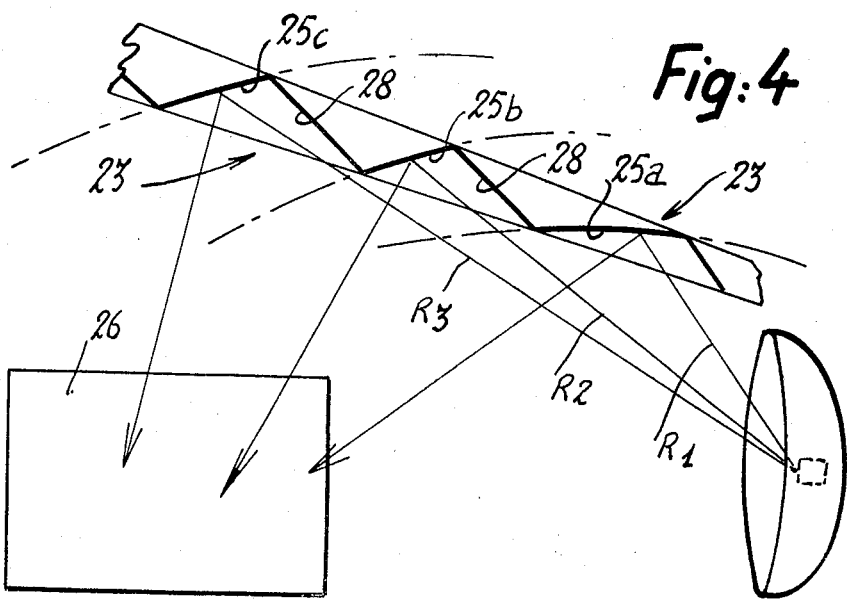
Fig:4

PROJECTION DEVICE, ESPECIALLY FOR PHOTOGRAPHY, MOTION PICTURES AND TELEVISION

This invention relates to a projection device which is primarily intended to be employed in the fields of photography, motion pictures and television.

It is already a known practice to make use of so-called "frontal" projection devices for projecting diapositives in transparency on a reflecting screen by means of a semi-reflecting mirror. This mirror performs two functions: the image which it is desired to project behind the object is reflected onto the screen and part of the light reflected from the screen is directed back to the camera.

A system of this type makes it possible to project only transparent documents such as diapositives whereas opaque documents such as postcards call for preliminary processing in order to produce diapositives which are suitable for use in a frontal projection apparatus. In all known devices of this type, the camera lens is placed in optical alignment with a projection lens in such a manner as to ensure that, when an image is projected onto the reflexive or back-reflecting screen, the shadow of the object on the screen is not collected by the camera lens. The projection lens of this type of device is solely intended to project the image of a transparent document, the size of the document being 6×6 cm or 24×36 mm, for example.

Another known type of equipment which is capable of projecting images of opaque documents is the apparatus known as an episcope.

This apparatus is simply placed on a table and its front end is supported on a device which permits adjustment for height. However, these devices cannot be employed satisfactorily in conjunction with electronic flashes or low-power lamps. Moreover, they are difficult to adjust and cannot be combined with cameras of all the types and dimensions used in photography and motion pictures. The optical system of the light sources also has very low efficiency.

The aim of the invention is to overcome these disadvantages by making it possible to construct a frontal projection apparatus which is capable of projecting images of opaque documents such as postcards under wholly satisfactory conditions.

To this end, the projection device in accordance with the invention essentially comprises a housing adapted to receive an object to be projected as well as a light source, a reflecting system placed within the housing in such a manner as to reflect the light emitted by the source onto the object to be projected. The top face of the housing is pierced in order to permit the passage of the luminous flux through an optical system placed above the housing. Said optical system is intended to cooperate with a camera and this latter is intended to photograph the projected image of the object on the screen, the object being placed within the housing and said housing being secured to a vertical support member in such a manner as to be adjustable for height. The projection device further comprises adjustable means which make provision for optical coupling between on the one hand the camera and on the other hand the optical projection system and the housing.

When the device under consideration is employed for the projection of opaque objects, these latter are placed on the bottom wall of the housing without any need to take copies in color transparencies beforehand as is the case with frontal projection devices of known type. This consequently avoids waste of time as well as the cost involved in this intermediate reproduction step.

In accordance with one embodiment of the invention in which the housing is designed, for example, in the form of a pyramid frustum whose largest face constitutes the bottom wall, and in which said wall is provided with a rotatable central support adapted to receive at least one opaque object to be projected, the light source is placed inside a first reflector having the shape of a segment of ellipsoid and attached to a side wall. The reflecting system further comprises a second ellipsoidal or cylindrical reflector attached to the housing wall which is located opposite to the first reflector, and two other reflectors attached to the side walls and folded in bellows-type pleats with reflecting facets constituted by portions of ellipsoid, the last-mentioned reflectors being intended to receive the light which is not reflected from the first and second reflectors.

A reflecting system of this type has extremely high efficiency in comparison with known systems and makes it possible to obtain color images of better quality with a higher degree of contrast.

Further distinctive features and advantages of the invention will become apparent from the following description. Three embodiments of the device in accordance with the invention are illustrated in the accompanying drawings which are given by way of example and not in any limiting sense, and in which:

FIG. 2 is a transverse sectional view of the housing shown in FIG. 1;

FIG. 3 is a plan view of the housing shown in FIGS. 1 and 2, this view being taken beneath the top face of said housing;

FIG. 4 is a partial schematic view to a larger scale showing the first reflector and a side reflector which is folded in bellows-type pleats together with the optical paths followed by the light between the light source and the object.

Figure 1:
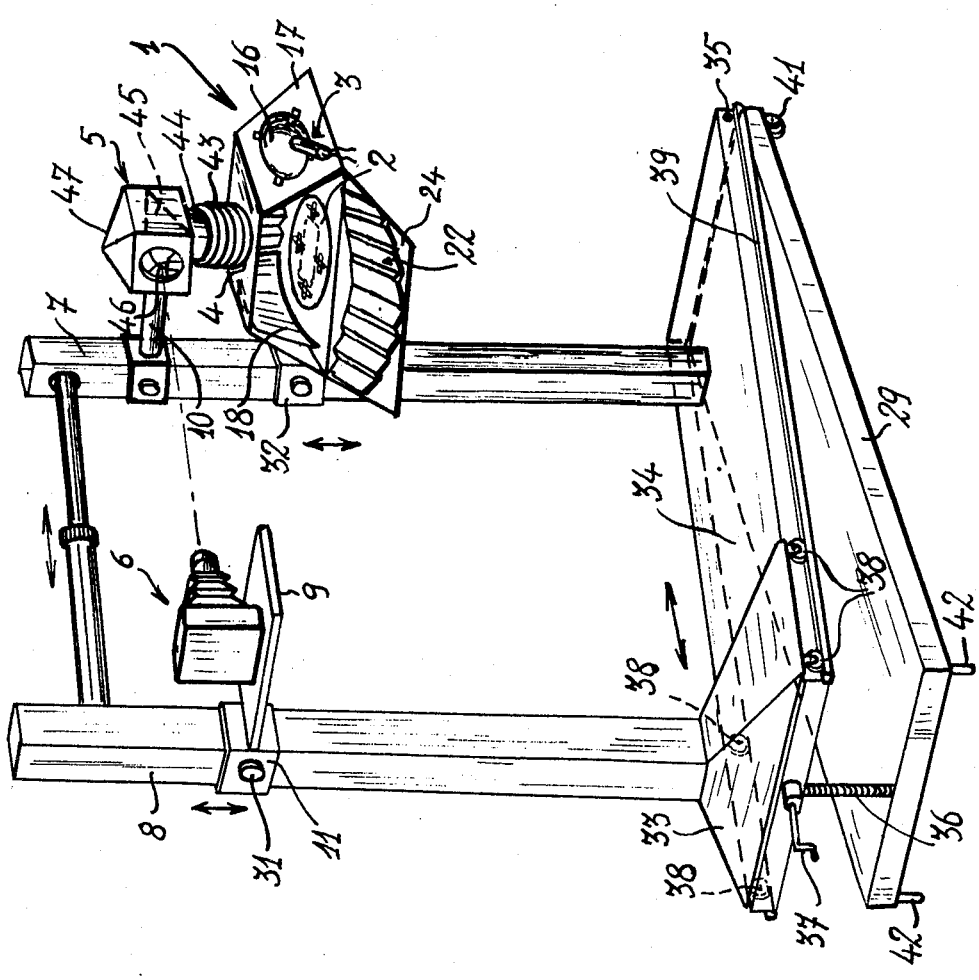
FIG. 1 is a perspective view of a first embodiment of the projection device in accordance with the invention for the projection of opaque objects.

In the embodiment illustrated in FIGS. 1 to 4, the projection device in accordance with the invention is designed for the projection of opaque documents in two dimensions such as postcards or even objects in three dimensions for photography, motion pictures or television.

This device comprises a housing 1 which is designed to receive an object 2 to be projected as well as a light source 3, a reflecting system placed within the housing 1 in such a manner as to reflect the light emitted by the source 3 and directed onto the object 2. The top face of the housing 1 is detachable and pierced by an opening 4 directly above the support 2 in order to permit the passage of the luminous flux through an optical projection system 5 which is placed above the housing 1 and projects the image of the object onto a screen (not shown).

The optical system 5 cooperates with a camera 6 for photographing the projected image of an object on a reflexive screen (not shown), said object being positioned on the support 2. The housing 1 which has the configuration of a pyramid frustum in the example illustrated is secured to a vertical support member 7 in such a manner as to permit adjustment for height. Adjustable means are additionally provided for permitting a suitable optical coupling between on the one hand the camera 6 and on the other hand the assembly consisting of the optical system 5 and the housing 1.

The means aforesaid comprise in particular a vertical upright member 8 to which is secured a horizontal support plate 9, said plate being adjustable for height by means of a sliding collar 11 which surrounds the upright member 8, the camera 6 being placed on the support plate 9.

The central support 2 is constituted by a detachable and rotatable disc placed inside the bottom portion of the housing in a manner known per se and provided on the top face thereof with cruciform holding lugs 12 (shown in FIG. 3), said lugs being slidably fitted in guide grooves 13 which are also disposed in a cruciform arrangement. In the embodiment which is illustrated, provision is thus made for four grooves 13 and four lugs 12. An opaque document such as, for example, a postcard of variable size can be fixed on the support 2 by displacing these holding lugs or claws 12 in sliding motion. Furthermore, the pivotal displacement of the support 2 about its axis and more precisely about a central ball (not shown) serves to adjust the angle at which the image is projected onto the screen. It is thus possible to displace the support 2 in such a manner as to ensure that the objects or documents placed on this latter are projected onto the screen at the desired point.

The light source 3 of a type known per se is constituted by the assembly of an electronic flash tube 14 and an incandescent "guide" lamp 15. However, the light source can also be simply constituted either by the flash tube or by a lamp of the incandescent type, for example. In the embodiment shown in FIGS. 1 to 4, the source 3 is placed within a first reflector 16 having the shape of a segment of ellipsoid, said reflector being attached to a side wall 17 of the housing 1, namely the wall opposite to the vertical support member 7. The reflecting system further comprises a second reflector 18 constituted by a portion of cylinder having either an elliptical or cylindrical cross-section. The reflector 18 is attached to the wall 19 of the casing 1, namely the wall located opposite to the first reflector 16. The other two reflectors 23, 22 are each attached to a side wall 21, 24 and folded in bellows-type pleats with reflecting facets such as those designated by the references 25a, 25b, 25c . . . (as shown in FIGS. 3 and 4). These facets are constituted by portions of ellipsoids having suitable dimensions and orientation with respect to the light source 3 and to the object 26 to be illuminated in order to receive the light which has not been reflected from the first and the second reflectors 16, 18 and which is thus redirected onto predetermined portions of the object 26 to be illuminated.

A few optical paths followed by the light rays between the source 3 and the first reflecting facets 25a, 25b . . . of the reflector 23 are shown in FIG. 4, in which the reflecting facets have also been extended on each side in order to show a portion of the contour of the ellipsoids on which said facets are located.

The orientations or angles of inclination of the facets 25a etc. with respect to the reflector 16 and with respect to the object 26 are therefore different in each case as a function of the angle of incidence of the light rays such as the rays R1, R2, R3 etc. which are directed towards the object 26.

The side wall 24 of the housing 1 to which the bellows reflector 22 is attached is pivotally mounted on hinges (not shown in the drawings) in order to allow access to the interior of the housing 1 as shown in FIG. 1.

It is thus possible to introduce or to withdraw the support 2 as well as the object or objects to be illuminated. It is also possible to arrange a composition of objects to be projected so that any desired features may be incorporated in the bottom-wall background which is to be projected onto the screen.

The reflector 18 receives that portion of the luminous flux which emanates from the source 3 and which has not already been reflected by either of the side reflectors 23, 22. There is thus shown in FIG. 2 the optical path followed by two light rays R4, R5 between the source 3 and the object 26 after reflection from the reflector 18. That internal surface of the housing 1 which is not covered by the reflectors 18, 22, 23, 16 and by the object 26 is blackened in order to prevent parasitic reflections. In fact, the reflectors 16, 18, 22 and 23 are placed in such a manner as to ensure that light cannot be reflected from these latter onto the surface of the object 26 and then reflected from a bright surface to the projection lens of the optical system 5. For this reason, the entire internal surface of the housing 1 which is not intended to contribute to illumination of the object 26 is black. On the other hand, it often proves desirable to have reflections which are visible at the location of the optical system 5 when certain metallic or metallized objects are placed on the surface 26. It is for this reason that the top surface of the housing 1 is detachable as mentioned earlier. This makes it possible to place on the internal face of the housing either a black nonreflecting plate or a white and metallic reflecting plate.

Moreover, the reflecting facets of the side reflectors 22, 23 are not only oriented as shown in FIG. 4 but also inclined with respect to the bottom wall of the housing 1 in the direction of the support 2 in such a manner as to provide effective reflection of the luminous flux onto the object 26 and not towards the other walls of the housing.

The reflecting facets 25a, 25b and so on are separated by non-reflecting intercalary facets 28 (shown in FIG. 4) since reflecting surfaces do not in fact serve any useful purpose in these portions of the reflectors. Furthermore, the thickness of said reflectors is predetermined and of approximately constant value, which may facilitate their manufacture.

The means for permitting optical coupling between the assembly formed by the housing 1 which is associated with the optical system 5 and the camera 6 comprise a platform 29 for supporting a frame 34 which is pivotally mounted on a hinge-pin 35. The two vertical upright members 7, 8 are adjustably mounted on said frame in such a manner as to be adjustable for height. The photographic camera, motion-picture camera or television camera which is placed on the support plate 9 or suspended at a suitable height can be positioned at a suitable height by sliding the collar 11 along the upright member 8, locking in position being ensured by means of a rotatable knob 31. The housing 1 is in turn secured to the vertical support member 7 by means of a similar system comprising a sliding collar 32 which surrounds the support member 7 and can be locked in position by means of a suitable knob. The upright member 8 for supporting the camera is rigidly fixed at the lower end thereof to a base 33 which is slidably mounted on the frame 34. The hinge-pin 35 of the frame is secured transversely to one end of the platform 29 in order to pass in the vicinity of the vertical support member 7. The frame 34 is provided at the end remote from the hinge-pin 35 with a device constituted by a threaded rod 36 which is attached to the platform 29 and supports the frame 34 and with an associated crank handle 37 for lifting the frame 34 as well as the upright member 8 on the threaded rod 36 in order to displace the frame 34 in pivotal motion about the hinge-pin 35.

The base 33 is slidably mounted on the frame 34 in such a manner that it can also be displaced from one end of the frame to the other. The means provided for this purpose consist of a set of rollers 38 which are fixed at the corners of the base 33 and are capable of running along guide rails 39, said rails being fixed on each side of the frame 34. The rolling system formed by the base 33, the rollers 38 and the longitudinal rails 39 serve to move the camera either towards or away from the associated optical system 5.

The end of the platform 29 which is nearest the vertical support member 7 is fitted with two runner-wheels 41 whilst the opposite end is fitted with two bearing studs or lugs 42 having the function of brakes for maintaining the entire projection device in position after this latter has been brought to the required location by means of the runner-wheels 41.

The optical system 5 is made up as follows: a bellows element 43 around the opening 4 of the housing 1 provides a connection between this latter and the projection lens 44. Said lens is secured to a box containing a semi-reflecting and semi-transparent mirror 45 which is inclined at an angle of 45 degrees. This unit is suitably positioned in such a manner as to reflect the luminous flux delivered from the housing 1 and transmitted by the lens 44 onto a projection screen (not shown) which is placed on the side away from the camera 6. The box containing the mirror 45 is also provided on the side nearest the camera 6 with a centering iris 46 of a type know per se and also with a hood 47 which is fixed at the top end and the internal surface of which is black in order to absorb the light received.

The technical effects and advantages of the frontal projection device in accordance with the invention are as follows:

for the practical application of this device, an opaque document such as a postcard, for example, is first chosen and suitably positioned within the housing 1, the side wall 24 of the housing having first been opened as explained earlier. The camera is then positioned on its support plate 9 in a suitable manner by employing the rolling system 38, 39 and the height-adjustment collar 11 so as to obtain satisfactory coupling with the alignment iris diaphragm 46. When the light source 3 has been turned-on, the image of the object 26 which is fixed on the support 2 is formed on the screen (not shown). A figure or person can be placed in front of the screen and the complete image can be photographed by the camera 6. Should it prove necessary in practice to project images for television, a television camera is accordingly placed on the support plate 9.

The projection device in accordance with the invention makes use of a single light source 3 constituted by the above-mentioned electronic flash tube and/or lamp of the incandescent type, for example whereas episcopes call for the use of two or four light sources.

Furthermore, an essential advantage obtained by means of the invention lies in the fact that the system of reflectors 16, 18, 22, 23 collects practically the entire quantity of light emitted by the two elements which constitute the light source 3 and reflect the light onto the object 26 to be projected. A very high degree of optical efficiency is consequently obtained since the reflecting facets 25a, etc. of the side reflectors 22, 23 and the two other reflectors 16, 18 are oriented in such a manner as to illuminate the entire surface of the object in a practically uniform manner. This makes it possible to form on the screen an image in color of very high quality and having very satisfactory contrast.

The projection lens 44 is preferably provided with an iris diaphragm which is extremely useful since it permits the possibility of varying the quantity of light transmitted to the screen and also of increasing the depth of field and the depth of focus. This is particularly advantageous when it is desired to project opaque, three-dimensional objects. The projection lenses of known episcopes are not fitted with iris diaphragms.

By way of example, the three-dimensional objects which can be projected onto the screen by means of the device in accordance with the invention include a hand, a watch, jewels, a flask, and so forth.

It is also possible to replace the semi-reflecting and semi-transparent mirror 45 by a mirror having a fully reflecting surface.

The fact that the camera 6 (for photography or motion pictures) is rigidly fixed to an upright member which is slidably mounted on the platform 29 and capable of moving the camera towards or away from the housing 1 is extremely important since the operator often desires to observe the image on the reflexive screen directly through the centering iris diaphragm 46. This possibility is not permitted by a projection system in which the camera is stationary. Moreover, in the case of certain types of shutters and lenses, it is very difficult to change the lens diaphragm and the shutter speed without having total access to the front of the camera. These different operations can be readily performed by virtue of the arrangements made in accordance with the invention for mounting the camera.

Figure 5:
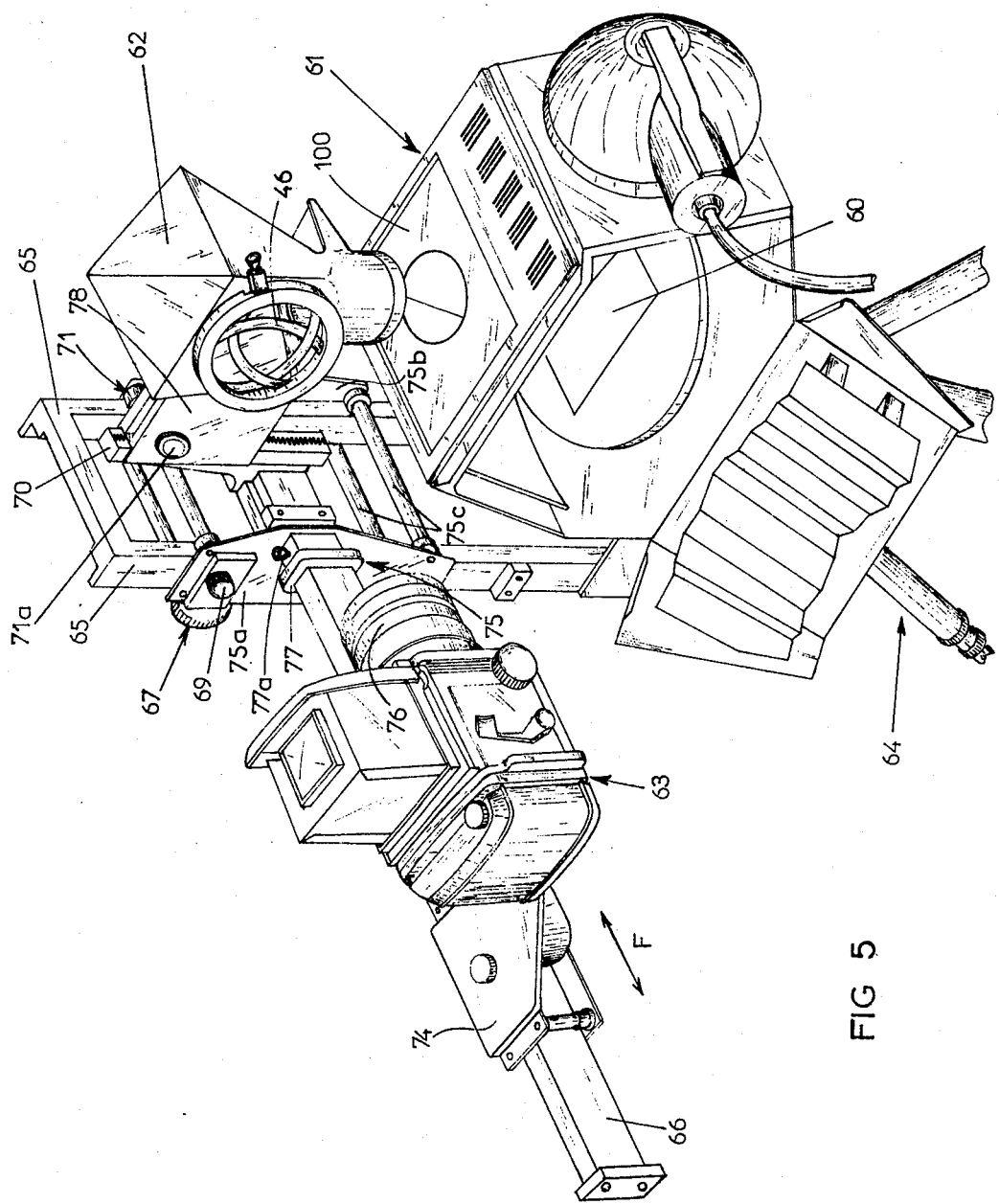
FIG. 5 is a perspective view of a second embodiment of the device in accordance with the invention.

In the alternative embodiment shown in FIG. 5, the device is intended to be employed for the projection of opaque documents such as the document 60. The means for providing optical coupling between the assembly formed by the housing 61 associated with the optical system 62 and the camera 63 comprise a tripod 64 for supporting an orientatable platform on which the housing 61 rests. The top surface 100 of the housing 61 is removable as in the previous embodiment.

The platform aforesaid also supports two parallel vertical uprights 65 which support the optical system 62 by means of a vertical rod 70. Said rod is attached to a horizontal bar 66 and this latter is in turn supported by a carriage 75 which is slidably mounted on the vertical uprights 65. In consequence, the optical system 62 is in fact supported by said uprights 65.

The camera 63 is carried by a member 74 which is slidably mounted on the bar 66 on which is also mounted a sliding collar 77 in the vicinity of the carriage 75. This collar 77 is associated with a locking knob 77a and serves as a stop for the sliding member 74 in order to permit adjustment of the maximum forward displacement of the lens 76 of the camera 63.

The horizontal bar 66 is fixed to one of the two vertical plates 75a, 75b of the carriage. Said plates are each capable of sliding vertically on a corresponding upright 65 and are coupled together by means of horizontal rods 75c. This assembly is provided with the following adjustment elements:

A focusing adjustment system comprising an operating knob 67 placed on one of the plates 75a which constitute the carriage 75 makes it possible to displace this latter either upwards or downwards along the uprights 65 whilst a second lateral knob 69 serves to lock the carriage 75 in position at the height which is chosen. Rotation of the knob 67 therefore has the effect of producing a vertical displacement of all the components carried by the carriage 75 and the bar 66, namely the camera 63, the optical system 62 and the iris diaphragm 46. This permits focusing of the image which is projected onto the screen (not shown) from the document 60.

The optical system 62 is adjustable for height on the vertical rod 70 (which is fixed to the bar 66) by means of an operating knob 71, and can be locked in position by means of the knob 71a. Vertical back-and-forth movements of the system 62 with respect to the rod 70 are carried out by means of a vertical coupling plate 78 which is capable of moving either upwards or downwards along the rod 70.

The iris diaphragm 46 can thus be centered with respect to the camera lens 76.

Adjustment of this device is carried out as follows:

The distance between the camera 63 and the optical system 62 is first adjusted by displacing the camera 63 together with its sliding support 74 along the bar 66 (as shown by the double arrow F). The knob 71 is then rotated so as to adjust the height of the optical system 62 and of the iris diaphragm 46 and thus to center this latter on the lens 76. The knobs 67 and 69 are then rotated so as to adjust the position of the camera 63 and of the optical system 62 with respect to the document 60 to be projected onto the screen.

The invention is not limited to the embodiments hereinbefore described and accordingly extends to alternative forms of construction. Thus the support 9 can be so arranged as to permit pivotal displacement of the camera instead of forward or backward displacement. This allows access to the front of the camera or permits convenient observation through the mirror 45. The bottom wall of the housing 1 can be made completely detachable so that it can be replaced by a transparent glass plate adapted to maintain books, leaflets and other documents in a flat position against the glass surface in order to permit projection of these latter with uniform sharpness of definition without any need to cut-out pages from books and the like. In all the embodiments of the projection device in accordance with the invention, the system of reflectors directs onto the object to be projected practically the entire quantity of light emitted by the light source. This makes it possible to obtain excellent lighting efficiency and therefore high quality of the image projected onto the reflexive screen. This standard of quality and optical efficiency cannot be achieved by means of known devices designed for the projection of opaque documents. The reflectors 22, 23 can be formed of metal such as oxidized and polished aluminum, for example, or of plastic aluminized in vacuum or alternatively of ordinary mirrors. The reflectors can be fabricated by die-stamping or folding if they are of metal, or by molding if they are of plastic. If ordinary mirrors are employed, they can simply be assembled on a suitable support.

The light source 3 can also be replaced by only one of its two components, namely the electronic flash tube or the guide lamp. The mirror 45 can be replaced by a totally reflecting mirror in order to permit use of the device as a normal episcope, in which case the camera is dispensed with.

Moreover, in the embodiment of FIG. 1, it is worthy of note that the housing of the optical projection system 5 is rigidly fixed to the vertical support member 7 by means of a coupling rod 10 provided with a collar which is slidably mounted on said vertical support member.

This makes it possible to adjust the housing of the system 5 for height. Furthermore, focusing of the projected image can advantageously be effected by adjusting the height of the housing 1 with respect to the optical system 5, thus making it unnecessary to carry out subsequent position-adjustment of the camera 6 with respect to the optical system 5.

It is also of interest to note that the projection device in accordance with the invention offers further advantages over the known system of frontal projectors which make use of color transparencies. These advantages can be summarized as follows:

(1) The projection process is no longer limited to a transparency or even to a photographic image on paper since it is now possible to contemplate instantaneous projection of objects which may or may not be opaque and in two or three dimensions without entailing the need for color transparencies. For example, a piece of textile fabric or dress material placed behind a fashion display mannequin, a glass bottle, coffee beans and so on, can be projected directly onto the screen.

(2) With color transparencies, details are lost in both the bright and dark portions since a color transparency is already a copy which has lost certain details. Also, a color transparency has a much higher contrast than the original. Thus, when copying (rephotographing) this copy, details are lost again. In the present invention, the original objects may be placed in the projector (rather than a copy), and since the contrast of the original is less than that of a color transparency, little or no loss is involved when photographing the projected image of the object located inside the projector.

(3) The surface area of projected objects can be between ten and thirty times larger than the area of diapositive slides having a size of $24 \times 36$ mm and $6 \times 6$ mm and employed in background projectors of types which have been known up to the present time. In consequence, the degree of magnification is considerably lower and the quality of the projected image is distinctly superior in the case of the epidiascope in accordance with the invention.

(4) The focal length of the lens employed in the apparatus according to the invention is distinctly greater than that of the lenses used for projecting slides $24 \times 36$ mm and $40 \times 40$ mm or $56 \times 56$ mm in size. By way of indication, this focal length can be 235 mm whereas the focal length of lenses used in known episcopes is between 50 and 80 mm. In consequence, the optical quality obtained is markedly superior. This also circumvents the problems attached to accuracy of adjustment which are encountered in lenses having short focal lengths. The depth of focus is correlatively of much higher value.

(5) The diameter of the lens which can be employed in the projection device in accordance with the invention is considerably larger than that of lenses employed up to the present time for projecting slides $24 \times 36$ mm and $40 \times 40$ mm or $56 \times 56$ mm in size. By way of example, the lens diameter is 67 mm in the case of a focal length of 235 mm. This large diameter removes one of the major problems encountered in known projector systems, namely that of the objectionable black line hitherto observed around the projected image on the screen in the case of conventional background projectors having projection lenses of small diameter. This black line is therefore suppressed and devices having two or four lenses can be employed correlatively without observing any black image outline. Thus there is no problem of optical alignment in the case of the apparatus in accordance with the invention.

(6) In the case of background projector systems which make use of color slides, it is possible only to project a slide which cannot be displaced within the projector. On the contrary, in the projection apparatus according to the invention, the object can be displaced in all directions. It is even possible to place a large number of objects inside the episcope and to move them with respect to each other in order to make up veritable compositions of different types. This enables the user to form his background as a function of the subject and as a function of the objects or documents selected for projection behind the subject on the screen.

A further interesting embodiment of the invention will be indicated: the bottom of the housing containing the reflectors and the object (or the objects) to be projected can be open, in order to permit the defiling of a succession of objects or images to be projected by means of an appropriate system known per se, located beneath the housing. Such an apparatus can be used notably for projecting objects in television.

I claim:

1. A front projection device primarily for use in still photography, motion picture photography and television, comprising:
    a housing adapted to receive an opaque object of which an image is to be projected and a light source for illuminating the object, the housing having side walls, a bottom wall and further having a pierced top face through which light reflected off the object can pass;
    a rotatable central support located in the bottom wall of the housing, whereby an opaque object can be received upon the support and be illuminated by the light source;
    a cylindrical reflector having an elliptical cross-section, the cylindrical reflector being attached to a side wall of the housing opposite to a light source received therein;
    first and second folded reflectors attached to side walls of the housing, the folded reflectors taking on a bellows-type pleated configuration having reflecting facets constituted by portions of ellipsoids and cooperating with the cylindrical reflector to form a reflecting system in which the folded reflectors reflect light unreflected by the cylindrical reflector;
    an optical system located above the housing for receiving light passing through the top face thereof;
    adjustable means cooperating with the optical system to establish optical coupling between a camera and the optical system; and
    a vertical support member secured to the housing in a manner that the height of the housing can be adjusted.

2. A front projection device according to claim 1, wherein the portions of ellipsoids forming the reflecting facets of the side reflectors are oriented with respect to the light source in such a manner as to reflect part of the light received directly from the source onto a predetermined portion of the opaque object.

3. A front projection device according to claim 1, wherein that internal surface of the housing which is not covered by the reflectors and by the opaque object is blackened in order to prevent parasitic reflections.

4. A front projection device according to claim 1, wherein the housing has the form of a pyramid frustum whose largest face constitutes the bottom wall thereof.

5. A front projection device primarily for use in still photography, motion picture photography and television, comprising:
    a housing adapted to receive an opaque object of which an image is to be projected and a light source for illuminating the object, the housing having a pierced face through which light reflected off the object can pass;
    a reflecting system placed within the housing in such a manner as to reflect light emitted by the source onto the opaque object, off which such light can be further reflected towards the top face of the housing;
    an optical system located above the housing for receiving light passing through the top face thereof;
    a platform;
    a first vertical upright member adapted to receive a camera and adjustably mounted on the platform in a manner that height of the camera can be adjusted;
    a second vertical upright member receiving the housing and optical system and adjustably mounted on the platform in a manner that height of the housing and optical system can be adjusted; and
    means for moving the camera towards and away from the optical system, whereby the camera and the optical system can be moved so as to establish optical coupling therebetween.

6. A front projection device according to claim 5, wherein the first vertical upright member for supporting the camera is rigidly fixed at a lower end to a base mounted on a frame, the frame being placed on the platform and pivotable about an axis which passes adjacent the second vertical upright member for supporting the housing and the optical system, said base being also mounted to slide from one end of said frame to another end thereof, the second vertical upright member being also supported by said pivoting frame.

7. A front projection device primarily for use in still photography, motion picture photography and television, comprising:
    a housing adapted to receive an opaque object of which an image is to be projected and a light source for illuminating the object, the housing having a pierced top face through which light reflected off the object can pass;
    a reflecting system placed within the housing in such a manner as to reflect light emitted by the source onto the opaque object, off which such light can be further reflected towards the top face of the housing;
    an optical system located above the housing for receiving light passing through the top face thereof;
    a tripod;
    an orientable platform supported by the tripod and upon which the housing rests;

two vertical upright members rigidly fixed to the platform and adapted to carry the optical system and a camera; and means for adjusting heights and relative positions of the optical system and the camera with respect to the housing, whereby an optical coupling can be established between the camera and the optical system.

8. A front projection device according to claim 7, wherein said means includes a carriage slideably mounted for vertical displacement on the vertical upright members and adjustable for height, said carriage being adapted to support the optical system above the housing a horizontal bar on which a camera can be mounted for horizontal displacement.

9. A front projection device according to claim 8, wherein the horizontal bar is equipped with a stop for the camera and wherein the optical system includes an iris diaphragm and is supported by a vertical rod which is in turn supported by the carriage, and wherein a height-adjustment system is placed on said vertical rod to permit height adjustment of the iris diaphragm, and wherein said diaphragm can be centered with respect to the camera lens.

* * * * *